Oct. 20, 1964  R. A. ANDREWS  3,153,749
COMBINED ELECTROMAGNET AND COVER ASSEMBLY
Filed Feb. 2, 1961  3 Sheets-Sheet 1
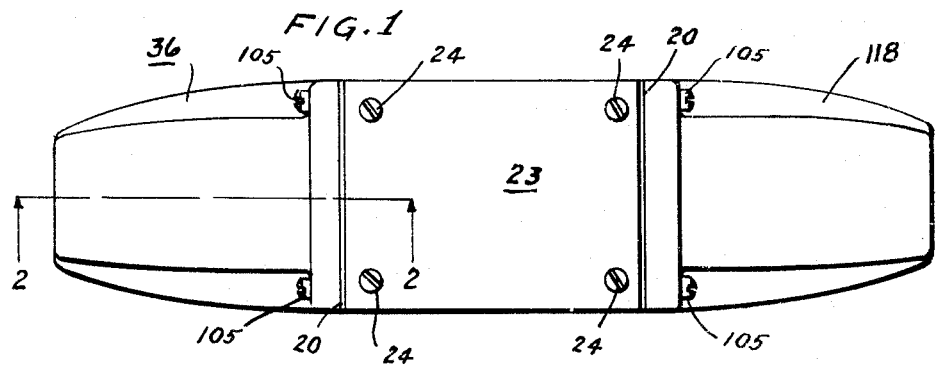
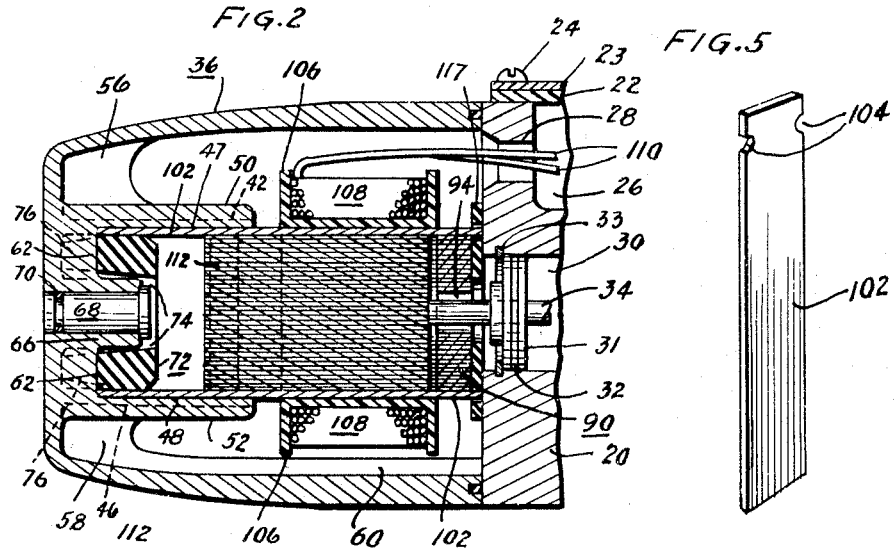
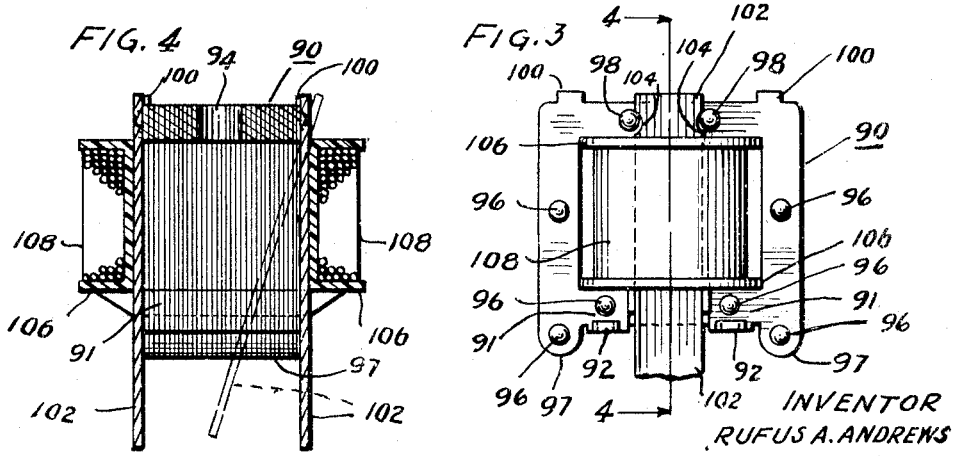
INVENTOR
RUFUS A. ANDREWS
BY Rey Eilers ATT'Y.

Oct. 20, 1964  R. A. ANDREWS  3,153,749
COMBINED ELECTROMAGNET AND COVER ASSEMBLY
Filed Feb. 2, 1961  3 Sheets-Sheet 2
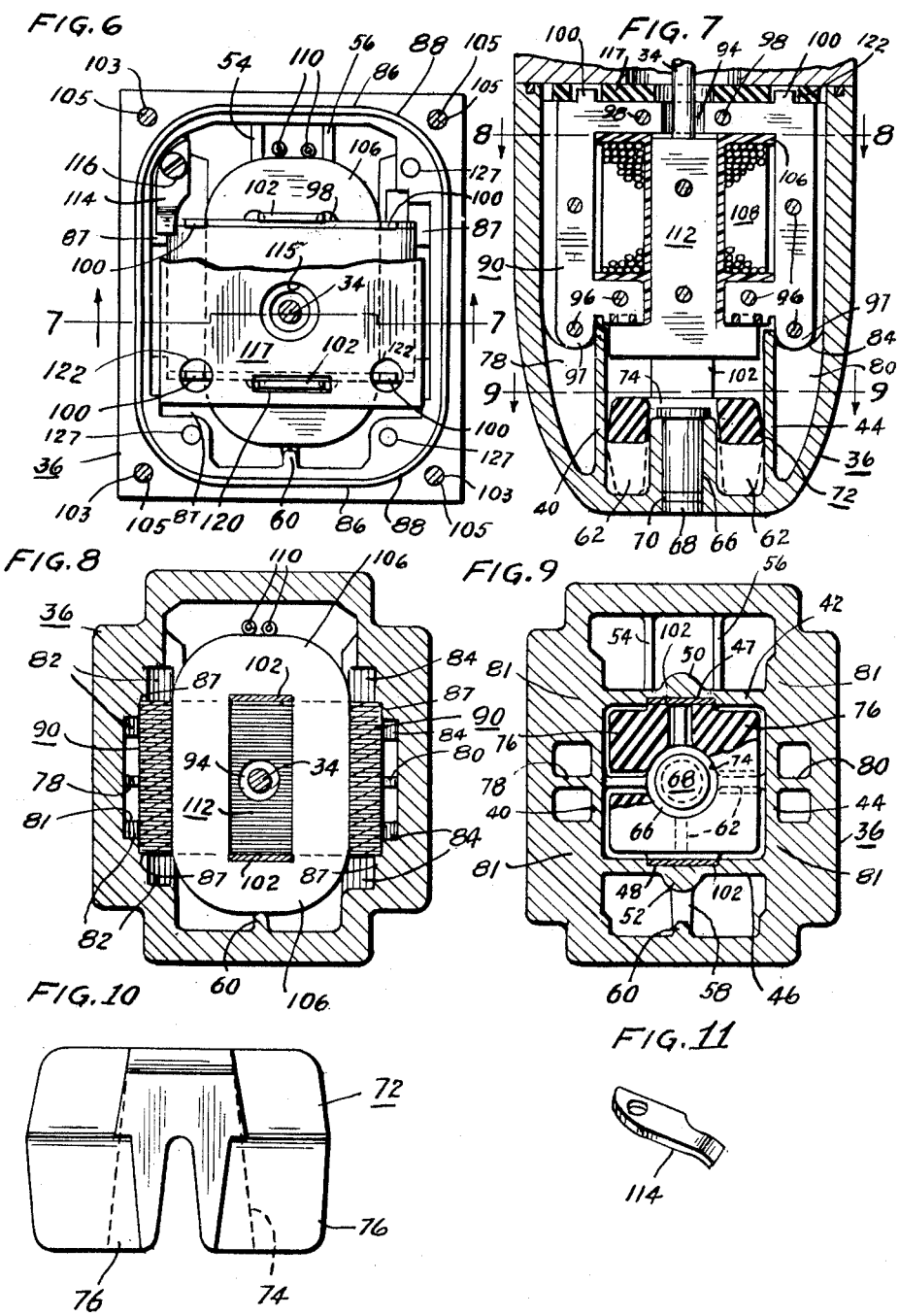
INVENTOR
RUFUS A. ANDREWS
BY
ATT'Y.

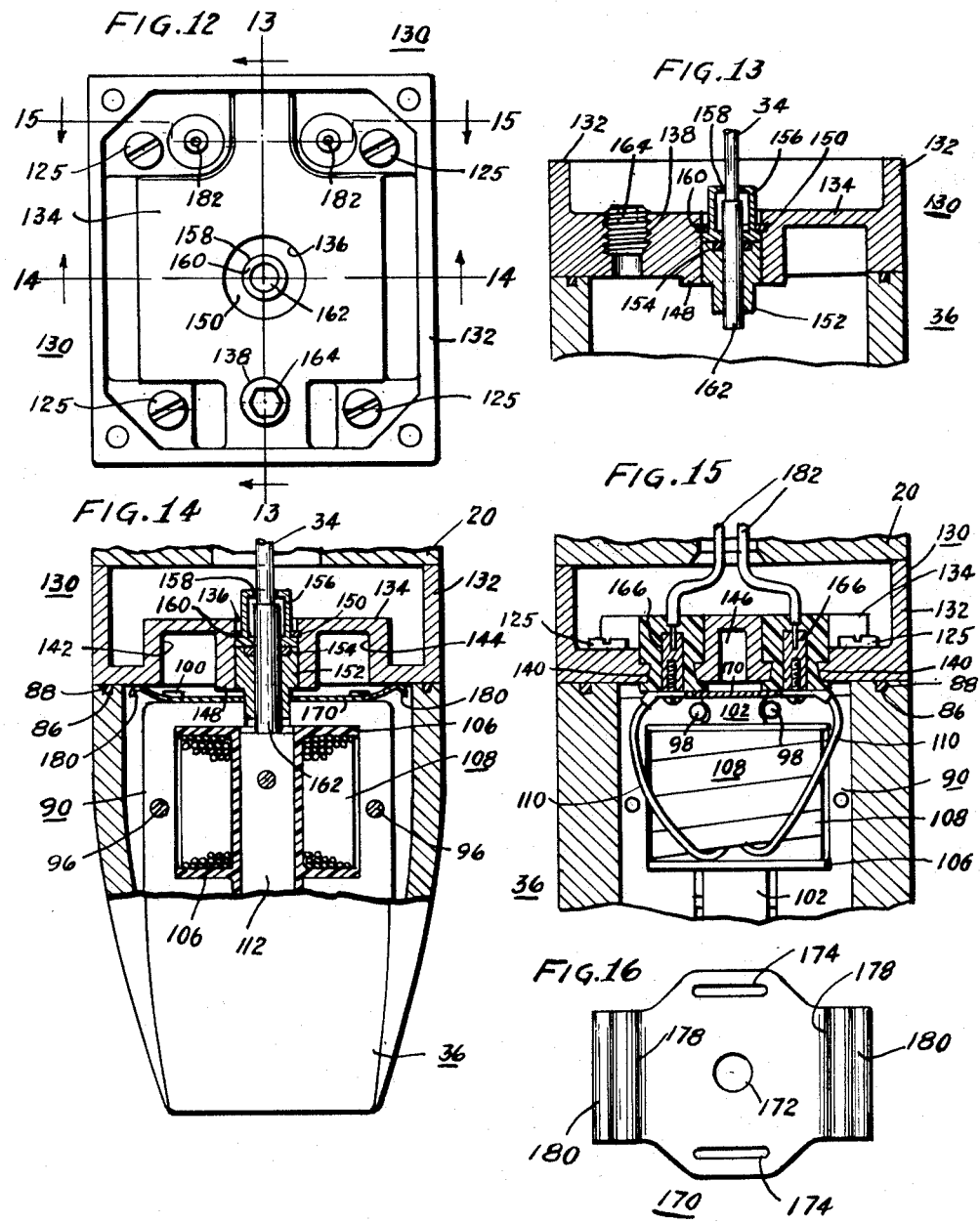

United States Patent Office 3,153,749
Patented Oct. 20, 1964

3,153,749
COMBINED ELECTROMAGNET AND
COVER ASSEMBLY
Rufus A. Andrews, Glendale, Mo., assignor to Sperry
Rand Corporation, a corporation of Delaware
Filed Feb. 2, 1961, Ser. No. 86,752
23 Claims. (Cl. 317—165)

This invention relates to improvements in electrical equipment. More particularly, this invention relates to improvements in electromagnetic devices.

It is, therefore, an object of the present invention to provide an improved electromagnetic device.

Electromagnetic devices such as solenoids, electromagnets and the like should be covered whenever they are mounted adjacent machine tools. Unless those electromagnetic devices are suitably covered, the free movement of the moving parts of those electromagnetic devices can be impeded by chips or turnings from the work pieces being worked upon by those machine tools. As a result, it is customary for solenoids, electromagnets and the like, which are to be mounted adjacent machine tools, to be provided with covers. Maintenance men in plants and factories frequently remove the covers of solenoids, electromagnets and the like, for inspection and service purposes; and, unfortunately, those maintenance men frequently fail to replace those covers. As a result, solenoids, electromagnets and the like which are initially provided with covers are frequently rendered inoperative because of chips and turnings which get into those solenoids, electromagnets and the like because of the removal and non-replacement of those covers. It would be desirable to provide an electromagnetic device which was made so maintenance men could not leave its cover off, and thus leave that electromagnetic device unprotected; because such an electromagnetic device would always be protected against chips, turnings, grit, dirt and the like. The present invention provides such an electromagnetic device; and it is therefore an object of the present invention to provide an electromagnetic device which is made so maintenance men can not leave its cover off.

The present invention makes its impossible for maintenance men to leave off the cover of the electromagnetic device by using that cover as part of the support or mounting for that electromagnetic device. As a result, if a maintenance man does not replace the cover, he will not be able to mount and actuate the electromagnetic device. In this way, all accidental and intentional failures to replace the cover of the electromagnetic device can be completely obviated. It is, therefore, an object of the present invention to provide an electromagnetic device which uses the cover as part of the support or mounting for that electromagnetic device.

Electromagnetic devices frequently have generally U-shaped cores; and some of those cores have inwardly-directed projections on the arms thereof. Those arms underlie portions of the plungers or armatures of the electromagnetic devices and serve as stops for those plungers or armatures. As the said portions of the plungers or armatures engage those inwardly-directed projections, those portions can apply powerful forces to those projections; and such forces will apply bending forces to the arms of the U-shaped cores. Those bending forces can, after many actuations of the electromagnetic device, cause fatigue cracks to appear at the closed ends of the U-shaped cores. It would be desirable to provide an electromagnetic device which has a U-shaped core that could remain substantially free from fatigue cracks, irrespective of the number of actuations of that electromagnetic device. The present invention provides such an electromagnetic device by using the cover to limit flexing of the arms of the U-shaped core of that electromagnetic device. That limitation on the flexing of the arms of the U-shaped core of that electromagnetic device has made it possible for that device to experience millions of actuations without the formation of any fatigue cracks in the core. It is therefore an object of the present invention to provide an electromagnetic device with a U-shaped core and to use the cover of that electromagnetic device to limit flexing of the arms of that core.

When the plunger or armature of an electromagnetic device strikes the core of that device, that core usually applies sizeable forces to the fasteners which hold that core. Those forces can fatigue those fasteners, and they can also fatigue those portions of the core which are held by those fasteners. The present invention largely obviates any such fatigue by permitting the core to "float" adjacent a resilient member. That member normally urges the solenoid core against stops; but that resilient member can yield, as the plunger or armature strikes the core, to permit that core to move a short distance away from those stops. The yielding of the resilient member will absorb a good part of the forces applied to the core and will thus cushion the shocks applied to that core. As a result, the fatigue that is experienced in the cores of many electromagnetic devices is not present in the core of the electromagnetic device provided by the present invention. It is therefore an object of the present invention to permit the core of an electromagnetic device to "float" adjacent a resilient member.

The electromagnetic device of the present invention has plates that confine the coil of that device against lateral movement but that permit limited longitudinal movement of the core of that device. Such plates are desirable because they hold that coil in register with the arms of that core and yet permit that core to "float" adjacent the resilient member. It is therefore an object of the present invention to provide an electromagnetic device with plates that confine the coil of that device against lateral movement but that permit limited longitudinal movement of the core of that device.

It is sometimes desirable to operate electromagnetic devices while the moving parts of those devices are immersed in oil; and yet it is usually permissible to operate electromagnetic devices while the moving parts of those devices are in air. It would be desirable, from the standpoint of production, to provide an electromagnetic device which could have the moving parts thereof operated in air or operated while immersed in oil. The present invention provides such an electromagnetic device; and it is therefore an object of the present invention to provide an electromagnetic device which can have the moving parts thereof operated in air or operated while immersed in oil.

Other and further objects and advantages of the present invention should become apparent from an examination of the drawing and accompanying description.

In the drawing and accompanying description, two preferred embodiments of the present invention are shown and described but it is to be understood that the drawing and accompanying description are for the purpose of illustration only and do not limit the invention and that the invention will be defined by the appended claims.

In the drawing,

FIG. 1 is a plan view of a valve housing which is equipped with two encased solenoids, FIG. 2 is a sectional view, on a larger scale, through one of the encased solenoids of FIG. 1, and it is taken along the plane indicated by the line 2—2 in FIG. 1, FIG. 3 is a partially-broken, side elevational view, of the solenoid of FIG. 2, and it is taken on a scale that is slightly smaller than the scale of FIG. 2, FIG. 4 is a sectional view through the solenoid of FIGS. 2 and 3, it is taken along the plane indicated by the line 2—2 in FIG. 1, it shows the plunger removed, and it shows one of the guide plates in moved position by means of dotted lines, FIG. 5 is a perspective view, on the scale of FIG. 2, of one of the guide plates shown in FIGS. 2, 3 and 4, FIG. 6 is a partially-broken end view of the encased solenoid of FIG. 2, as that solenoid has been rotated ninety degrees about its axis, FIG. 7 is a sectional view through the encased solenoid of FIG. 2, and it is taken along the plane indicated by the line 7—7 in FIG. 6, FIG. 8 is a sectional view through the encased solenoid of FIG. 2, and it is taken along the plane indicated by the line 8—8 in FIG. 7, FIG. 9 is a partially broken-away, sectional view through the encased solenoid of FIG. 2, and it is taken along the plane indicated by the line 9—9 in FIG. 7, FIG. 10 is a side elevational view, on a much larger scale, through a resilient cushion used with the encased solenoid of FIG. 2, FIG. 11 is a perspective view of a securing clip used in the encased solenoid of FIG. 2, FIG. 12 is an end view of an adapter that can be used with the encased solenoid of FIG. 2, FIG. 13 is a sectional view through the adapter of FIG. 12, and it is taken along the plane indicated by the line 13—13 in FIG. 12, FIG. 14 is a sectional view through the adapter of FIG. 12 and through the encased solenoid used with that adapter, and it is taken along the plane indicated by the line 14—14 in FIG. 12, FIG. 15 is a partially-broken, partially-sectioned view through the adapter and encased solenoid of FIG. 14, and it is taken along the broken plane indicated by the line 15—15 in FIG. 12, and FIG. 16 is a plan view of the resilient member used in the encased solenoid of FIG. 14.

Referring to the drawing in detail, the numeral 20 generally denotes the housing of a valve which is operated by a pair of encased solenoids. The valve and its housing are not, per se, a part of the present invention. A recess 26 is provided in the housing 20 to facilitate the connecting of the leads of the encased solenoids to conductors which extend into that recess and which can be suitably connected to a source of power by appropriate control switches. A cover plate 22 normally closes that recess; and fasteners 24, shown as screws, releasably secure that cover plate to that housing. If desired, as indicated by the drawing, the cover plate 22 can have a name plate 23 fixedly secured to its outer face. Passages 28 are located at the ends of the recess 26, and those passages accommodate the leads which are connected to the coils of the encased solenoids.

The numeral 30 denotes a centrally-located, axially-extending recess in the valve housing 20. An annular guide 31 is mounted adjacent the left-hand end of that passage, and a snap ring 33 extends into an annular groove in the wall of the recess 30. A compression spring, not shown, holds the annular guide 31 against that snap ring. The guide 31 has a groove in its periphery, and on O-ring 32 is disposed in that groove to keep oil from leaking between that guide and the wall of the recess 30. The guide 31 accommodates a rod 34; and that rod can be moved to the left by the right-hand encased solenoid in FIG. 1, and can be moved to the right by the left-hand encased solenoid in FIG. 1.

The cover for the left-hand encased solenoid is denoted by the numeral 36; and that cover has walls 40, 42, 44 and 46 projecting upwardly from the closed end thereof, as shown by FIG. 9. As indicated particularly by FIG. 7, the walls 40 and 44 terminate short of the vertical midpoint of the cover 36; and as indicated by FIG. 2, the walls 42 and 46 extend a short distance above the level of the upper edges of the walls 40 and 44. An axially-extending groove 47 is formed in the inner face of the wall 42, and a similar groove 48 is formed in the inner face of the wall 46. The grooves 47 and 48 are in register with each other, as shown by FIG. 9; and they terminate short of the closed end of the cover 36, as shown by FIG. 2. Bosses 50 and 52, respectively, are formed at the outer faces of the walls 42 and 46, and they are in register with the grooves 47 and 48. Those bosses make up for any reductions in strength which result from the formation of the grooves 47 and 48 in the inner faces of the walls 42 and 46. The bosses 50 and 52 extend the full lengths of the walls 42 and 46, as shown by FIG. 2; and while they are shown as being semi-circular in cross section, they could be given polygonal cross sections.

The numeral 54 denotes a short web which extends between the wall 42 and the interior of the cover 36; and a similar web 56 extends between that wall and that interior, as shown by FIG. 2. The webs 54 and 56 are disposed on opposite sides of the boss 50, as shown by FIG. 9; and those webs are quite short. A short but thick web 58 extends between the boss 52 and the interior of the cover 36. An indexing web 60, which is quite shallow, extends upwardly from the web 58, as shown particularly by FIG. 2. A number of short webs 62 extend inwardly from the walls 40, 42, 44 and 46 and stiffen a sleeve-like portion 66 of the cover 36. That sleeve-like portion is integral with the closed end of the cover 36; and it defines a centrally-located passage for a pin 68 which has a head thereon and which has a groove adjacent the opposite end thereof. That groove accommodates an O-ring 70 of a suitable oil-resistant material. The head of the pin 68 limits the movement of that pin to the left in FIG. 2; and the O-ring 70 engages the inner face of the sleeve-like portion 66 to provide a liquid-tight seal between that sleeve-like portion and the pin 68.

The numeral 72 denotes a cushion, of suitable resilient, oil-resistant material, which has a central passage 74 therethrough to accommodate the sleeve-like portion 66. That cushion has four feet 76 that can fit down into the spaces defined by the webs 62, by the walls 40, 42, 44 and 46, and by the sleeve-like portion 66. That cushion will be suitably held in position against dislodgment relative to the cover 36 by an adhesive. As indicated particularly by FIG. 2, the outer face of the cushion 72 extends outwardly beyond the head of the pin 68.

The numeral 78 denotes a web which extends between the wall 40 and the interior of the cover 36, and a generally similar web 80 extends between the wall 44 and the interior of that cover. The webs 78 and 80 are in register with each other, as indicated particularly by FIG. 9; and the upper faces of those webs have arcuate surfaces, as indicated by FIG. 7. Bosses 81 are provided at the interior of the cover 36, and those bosses have concave ledges 82 and 84. Those ledges are at the same level, and they have the same curvature, as the curved upper edges of the webs 78 and 80.

The numeral 87 denotes grooved bosses that extend from the ledges 82 and 84 to points just short of the end face of the cover 36. The grooves of those bosses define a generally rectangular recess which extends from that open end to the level of those ledges.

Preferably, the cover 36, the walls 40, 42, 44 and 46, the grooves 47 and 48, the bosses 50, 52, 81 and 87, the webs 54, 56, 58, 60, 62, 78 and 80, the sleeve-like portion 66, and the ledges 82 and 84 are all formed by a die-casting operation. Such an operation provides a sturdy and closely-dimensioned integral support for the solenoid of the present invention.

The numeral 86 denotes a continuous groove which is formed in the end face of the cover 36; and that groove accommodates an oil-resistant, resilient seal 88. Normally, the outer face of that seal will project outwardly beyond that end face, but when the cover 36 is assembled with the valve housing 20, that seal will yield sufficiently to be compressed within the groove 86. However, because of its compressed condition, that seal will establish a liquid-tight engagement with the end face of the valve housing 20 and thereby prevent egress of liquid.

The numeral 90 generally denotes the U-shaped, laminated core of the solenoid that is mounted and held within the cover 36. That core has projections 91 which are formed at the inner faces of the arms of that core, and those projections extend toward each other. Lag loops will be suitably held within recesses in the faces of those projections by a material 92, such as epoxy resin; all disclosed in Herald W. Bartels' application for Electrical Equipment, Serial No. 80,950, which was filed on January 5, 1961. An opening 94 is provided in the closed end of the core 90, as indicated particularly by FIGS. 2 and 4, and that opening will accommodate the left-hand end of the rod 34 in FIG. 2. The numeral 97 denotes convex faces on the free ends of the arms of the core 90, and those convex faces have curvatures which are generally complementary to the curvatures of the concave ledges 82 and 84 on the bosses 81. The rounded faces 97 of the ends of the arms of the core 90 will guide those arms outwardly of the walls 40 and 44; and those arms will normally abut those walls intimately.

The outermost laminations of the core 90 have projections 100 thereon, as indicated particularly by FIGS. 3 and 4; and those projections will confront, but will be spaced a short distance from, the end face of the valve housing 20. Rivets 96 extend through all of the laminations of the core 90, and rivets 98 also extend through all of those laminations. The rivets 96 and 98 coact to fixedly secure all of the various laminations of the core together.

The numeral 102 denotes an elongated metal plate which has notches 104 adjacent one end thereof. Two such plates are provided; and the notches 104 of those plates are dimensioned so they can accommodate the heads of the rivets 98 of the core 90. The plates 102 are considerably longer than the arms of the core 90, as indicated particularly by FIGS. 2 and 4; and the notch-free ends of those plates extend into the grooves 47 and 48, respectively, in the walls 42 and 46 of the cover 36, as indicated by FIGS. 2 and 9. Those notch-free ends abut the lower ends of those grooves, and the notched ends of those plates abut the end face of the valve housing 20.

The numeral 106 denotes a coil form which is preferably made of a non-magnetic material that is sturdy and that has a slippery feel. Nylon, mylar or other suitable plastic can be used in making that coil form. A coil 108 is suitably wound on that coil form, and leads 110 extend outwardly from that coil. When the coil form and its coil are appropriately assembled within the cover 36, and when that cover is assembled with the valve body 20, the leads 110 will extend through the passage 28 into the recess 26. Suitable connections will be made in that recess between those leads and the conductors which are connected to the source of power by appropriate control switches.

The central opening of the coil form 106 is longer than the width of the core 90; and, as a result, the plates 102 can be passed downwardly between the narrow inner faces of the coil form 106 and the side faces of the closed end of the core 90. To facilitate the insertion of the plates 102 into position, intermediate the narrow inner faces of the coil form 106 and the side faces of the closed end of the core 90, and also to enable the notches 104 to be placed in register with the heads of the rivets 98, the plates 102 will be moved through the coil form 106 at the angle indicated by dotted lines in FIG. 4 until the notched ends thereof have passed through the spaces defined by the end of the coil form and the closed end of the core 90. Thereafter the plates 102 will be moved away from each other until they abut the narrow inner faces of the coil form 106 and abut the side faces of the closed end of the core 90. At such time, the notches 104 will accommodate the heads of the rivets 98; and at such time the plates 102 will be parallel to each other, as indicated by solid lines in FIG. 4. The notches 104 have a larger radius of curvature than do the heads of the rivets 98; and, as a result, the core 90 can reciprocate slightly relative to the plates 102. The plates 102 will, at this time, lock the coil form 106 into position relative to the core 90.

The numeral 112 denotes a T-shaped plunger for the solenoid held by the cover 36. The head of that plunger confronts the resilient cushion 72, and the stem of that plunger confronts the left-hand end of the rod 34. When the coil 108 is energized, the plunger 112 will be pulled to the right in FIG. 2; and the projecting portions of the head of that plunger will strike the inwardly-extending projections 91 on the arms of the core 90. Those portions of the head of the plunger will strike those projections with substantial force, and that force will tend to bend the two arms of the core 90 toward each other. However, the intimate engagement between the free ends of those arms and the walls 40 and 44 of the cover 36 will coact to keep those arms from bending toward each other. As a result, the bending fatigue that is customarily experienced in the U-shaped cores of electromagnetic devices is obviated in the core of the present invention. The convex faces 97 on the free ends of the arms of core 90 will abut the concave ledges 82 and 84 on the bosses 81, those free ends will abut the outer faces of the walls 40 and 44, and the corners of core 90 will abut and be confined by the grooves in the bosses 87. This means that the bosses 81 and 87 and the walls 40 and 44 fix the position of the core 90 within the cover 36.

The numeral 114 denotes a clip which can overlie part of the core 90, as indicated particularly by FIG. 6. The engagement between the core 90 and the walls 40 and 44 and the grooved bosses 87 holds and confines the cover against movement laterally of the cover 36. As a result, the clip 114 is principally provided to limit movement of the core 90 longitudinally of the cover 36. A fastener 116, shown as a screw, fixedly secures the clip 114 to the cover 36; but that fastener is readily removed to permit removal of the core 90 from the cover 36.

As the core 90 is set in position between the grooved bosses 87, the plates 102 will telescope into the grooves 47 and 48 in the walls 42 and 46 and the free ends of that core will intimately engage the outer faces of those walls. The notch-free ends of the plates 102 will extend to the innermost ends of the grooves 47 and 48, and the notched ends of those plates will be close to the plane of the end face of the cover 36. Those notched ends will be able to abut the end face of the valve housing 20, when the cover 36 is secured to that valve housing by screws 105 which pass through the openings 103 in that cover. The projections 100 on the outermost laminations of the core 90 will be spaced short distances from that end face of that valve housing, and will thus coact with the notches 104 to permit limited reciprocable movement of the core 90 relative to that end face. However, the ledges 82 and 84 on the bosses 81 will limit the overall reciprocable movement of the core 90 to a small value.

The numeral 117 denotes a plate, of a suitable resilient material, which has a central opening 115 to accommodate the left-hand end of the rod 34. The plate 117 also has openings 120 to accommodate the notched ends of the plates 102, and has openings 122 to accommodate the projections 100 on the outermost laminations of the core 90. The plate 117 will lie intermediate the end face of the valve housing 20 and the closed end of the core 90, as shown by FIG. 2. That resilient plate will be in a compressed state and will urge the convex faces, on the free ends of the arms of the core 90, against the concave ledges 82 and 84. However, that plate can yield even further, to permit the core 90 to move even closer to the end face of the valve housing, as the plunger 112 strikes the projections 91 on the arms of that core; and hence that plate enables that core to "float" adjacent the end face of the valve housing 20. The "floating" action provided by the resilient plate 117 adds to the overall life of the solenoid provided by the present invention.

The numeral 118 denotes an encased solenoid which is the mirror image of the encased solenoid within the cover 36. The encased solenoid 118 is secured to the right-hand end face of the valve housing 20.

The rod 34 will normally be held in its full left-hand position by energization of the encased solenoid 118 or will be held in its full right-hand position by energization of the coil 108. If it were to be assumed that the rod 34, and the valve element associated with it, were in their full left-hand positions, that rod would be holding the plunger 112 adjacent the cushion 72. If the encased solenoid 118 were deenergized and the coil 108 were energized, the plunger 112 would move to the right and would force the rod 34 to move to the right to move the valve element to the right. As the plunger 112 reached the end of its stroke, it would apply a sharp force to the inwardly-extending projections 91 of the core 90. The engagement between the walls 40 and 44 and the free ends of the arms of the core 90 would keep those arms from bending toward each other; and the plate 117 would limit and cushion movement of the core 90 toward the valve housing 20. The said movement of the core 90 would be permitted by the notches 104 in the plates 102. After the plunger 112 comes to rest, the plate 117 will return the core 90 to its normal position; and in that position the ledges 82 and 84 will receive the convex faces at the free ends of the arms of the core 90. Also, in that position, the walls 40 and 44 will again resist inward bending of the arms of the core 90. As the plunger 112 moved, it was guided by the plates 102 and also by the wide inner faces of the coil form 106; and the plates 102 will keep the plunger 112 from abrading the walls 42 and 46.

The rod 34 will remain in its full right-hand position until the coil 108 is de-energized and the encased solenoid 118 is energized. At such time, the rod 34 will be forced to the left; and it will engage the end of the stem of the T-shaped plunger 112 and force that plunger to move to the left. The head of that plunger will engage the resilient cushion 72; and that cushion will ease the stopping of the left-hand movement of that plunger, thereby minimizing the shock to which that plunger and the cover 36 would otherwise be subject. The plunger 112 and the rod 34 will then remain in their full left-hand positions until the encased solenoid 118 is de-energized and the coil 108 is again energized.

The rib 60 at the interior of the cover 36 is provided to facilitate proper orientation of the coil form in that cover. Specifically, that rib is intended to require the assembler to dispose that side of the coil 108, from which the leads 110 project, away from that rib; all as indicated by FIG. 8. The coil 108 is wound on the coil form 106 before that coil form is assembled with the core 90, and then that coil form is moved laterally into position between the arms of that core. That coil form will thereafter be held in that position by the plates 102.

If at any time it should become desirable to shift the valve element to the right without energizing the coil 108, the operator can use a screw driver or other implement to press inwardly on pin 68. That pin will then move to the right to abut the head of plunger 112 and will then move that plunger into the position indicated by FIG. 2. The O-ring 70 will maintain a liquid-tight engagement between pin 68 and the sleeve-like portion 66 of cover 36; but will, nevertheless permit that pin to slide relative to that sleeve-like portion.

Solenoids which have been made in accordance with the principles and teachings of the present invention have been actuated several million times without any cracking of the arms of the core 90. Furthermore, those solenoids have been mounted adjacent machine tools without any impeding of the movable parts of those solenoids, because those solenoids can not be mounted while their covers are removed.

Referring to FIGS. 12–16, the numeral 130 generally denotes an adapter that can be interposed between the valve housing 20 and the solenoid cover 36. That adapter has a rectangular wall 132 that abuts the end face of the valve housing 20 and also abuts the end face of the cover 36. The resilient seal 88 in the groove 86 in the end face of the cover 36 will form a liquid-tight seal between that end face and the wall 132 of the adapter 130.

A horizontal wall 134 of the adapter 130 is disposed below the level of the upper edge of the wall 132; and an opening 136 extends downwardly through the wall 134. That wall also has a threaded opening 138 through it, and that opening is spaced from the opening 136. Two openings 140 are provided in a reduced-thickness portion of the wall 134; and those openings and the opening 138 are oppositely disposed of the central opening 136.

Recesses 142, 144 and 146 are formed in the underside of the wall 134, and those recesses are spaced apart approximately one hundred and twenty degrees. The recess 146 is disposed adjacent the openings 140, as indicated by FIG. 15; and the recesses 142 and 144 are disposed on opposite sides of the opening 136, as indicated by FIG. 14. A shallow circular boss 148 extends downwardly a short distance below the level of the bottom face of the adapter 130, as shown by FIG. 14. An annular groove 150 is provided at the interior of the opening 136 in the wall 134 of the adapter 130; and that groove is spaced from the shoulder in that opening.

The numeral 152 denotes a bushing that can be cast within or pressed into the opening 136. Whether cast or pressed in position within that opening, that bushing will provide an oil-tight seal with those portions of wall 134 which define that opening. An annular recess 154 is provided in the upper end of the bushing 152, and that recess is contiguous with the passage through that bushing. That recess is intended to accommodate an O-ring of oil-resistant, resilient material.

A cup-shaped retainer 156 has the lower end thereof extending into the opening 136 and abutting the upper face of the bushing 152. That retainer and that bushing will coact to hold the O-ring within the annular recess 154. An opening 158 is provided in the closed end of the retainer 156, and that opening is large enough to accommodate the free end of the rod 34 but is too small to accommodate a rod 162 that extends into that retainer. As a result, the retainer 156 permits the rod 34 to engage the rod 162 while preventing unlimited movement of the latter rod upwardly relative to the wall 134. A snap ring 160 overlies an outwardly-projecting flange adjacent the open end of the retainer 156, and that ring extends into the annular groove 150. As a result, that ring prevents accidental separation of the retainer 156 and of the O-ring from the wall 134 of the adapter 130.

A filler plug 164 is rotatably mounted in the threaded opening 138 in the wall 134 of the adapter 130. That plug will normally close that opening, but that plug can be removed to permit oil to be introduced through that opening. That opening is spaced away from the recesses 142, 144 and 146; and its lower end extends down to the level of the open ends of those recesses.

The numeral 166 denotes insulated connectors that are disposed within the openings 140 in the wall 134 of the adapter 130. Those connectors have threaded sockets in the lower ends thereof, and those sockets accommodate the threaded shanks of screws. The leads 110 of the coil 108 of an encased solenoid, which is identical to the encased solenoid of FIG. 2, are suitably secured to the lower ends of the connectors 166 by the said screws. Leads 182 are suitably secured to the upper ends of the connectors 166, and those leads will extend through the passage 28 and into the recess 26 in the valve housing 20. A sealing material, such as an epoxy resin, is used to fill the openings 140 and to fixedly hold the connectors 166 against shifting relative to those openings. That sealing material will coact with the intimate engagement between the opening 136 and the bushing 152 and with the intimate engagements between the O-ring and rod 162 and bushing 152 to keep oil from passing from one side of the wall 134 to the other.

The numeral 170 generally denotes a resilient plate that is used instead of the resilient plate 117 of FIG. 2. While the latter plate will preferably be made of synthetic rubber or some similar material, the plate 170 will preferably be made of springy metal. That plate has a central opening 172 to accommodate the projecting end of the shouldered sleeve 152; and, as shown by FIG. 14, that projecting end extends through the opening 172 and into the opening 94 in the closed end of the core 90. The plate 170 also has slots 174 to accommodate the notched ends of the plates 102, and it has cut-away corners to accommodate the projections 100 on the outermost laminations of the solenoid core 90. The plate 170 has bends 178 therein, adjacent the ends thereof, and those bends dispose the ends of that plate at angles of about twenty degrees to the flat center of that plate. The ends of that plate are, themselves, bent to have convex upper surfaces, as shown particularly by FIG. 14. Those convex upper surfaces will abut the lower face of the wall 134 and will force the flat center of that plate against the closed end of the core 90. That plate will normally be compressed and will thus hold the convex faces at the free ends of the arms of the core 90 against the concave ledges 82 and 84 on the bosses 81 of the cover 36. However, that plate can yield, as the plunger 112 is forced against the inwardly-extending projections 91 of the core 90, to permit the closed end of that core to move even closer to the wall 134 of the adapter 130. When the plunger 112 comes to rest, the plate 170 will again press the convex faces at the free ends of the arms of the core 90 against the concave ledges 82 and 84 on the bosses 81 of the cover 36.

The plate 170 operates in the same manner in which the plate 117 operates; and the encased solenoid of FIGS. 12-15 is identical in structure and operation to the encased solenoid of FIGS. 2-11. However, the plunger 112 in FIG. 14 moves the rod 162 instead of the rod 34—the rod 162 moving and being moved by the latter rod.

The numeral 125 denotes four screws which have sealing heads and which are used to secure the adapter 130 to the cover 36. The sealing heads of those screws will coact with that adapter to prevent leakage of oil around those screws. The shanks of those screws will seat in threaded openings 127 in the cover 36. Where the adapter 130 is used, the clip 114 will be omitted, because that adapter and the resilient element 170 will hold the core 90 in position.

By using the adapter 130 it is possible to fill the cover 36 with oil and thus enable the plunger 112 to operate while immersed in oil. That oil will become warm from the heat generated by the passage of current through the coil 108; and that oil will expand. However, the air spaces provided by the recesses 142, 144 and 146 will permit that oil to expand without creating destructive pressures within the cover 36. As a result, a safety valve, with its potential loss of oil, is not needed.

The encased solenoids provided by the present invention can be operated in air or can be operated in oil. All that need be done when a customer desires an oil-filled solenoid is to take a regular production-line, encased solenoid, bolt an adapter 130 to its end face, and pour oil through the opening 138. As a result, duplications in inventories, tools and processes are obviated.

The bosses 50 and 52 of the cover 36 perform an additional function, namely, facilitating the assembly of the solenoid with the cover 36. An inexperienced or inattentive assembler could tilt the axis of the core 90 relative to the axis of the cover 36 as he was telescoping that core into position within that cover. In the absence of the bosses 50 and 52, one plate 102 could pass inwardly of one of the walls 42 or 46 and the other plate 102 could pass outwardly of the other of those walls; and this would result in an improper assembling of the core with the cover. The bosses 50 and 52 will block any passing of the plates 102 outwardly of the walls 42 and 46 and will thereby facilitate proper, and thus avoid improper, assembling of the solenoid with the cover 36.

Whereas the drawing and accompanying description have shown and described two preferred embodiments of the present invention it should be apparent to those skilled in the art that various changes may be made in the form of the invention without affecting the scope thereof.

What I claim is:

1. The combination of a solenoid and a cover therefor which comprises a solenoid which has a U-shaped core and a T-shaped plunger, said core having inwardly-directed projections on the arms thereof, said inwardly-directed projections being spaced apart to accommodate the stem of said plunger and said inwardly-directed projections having faces to intercept the head of said plunger, said cover having surfaces that receive the free ends of said arms of said core and that resist bending of said arms when said head of said plunger strikes said inwardly-directed projections, said cover having grooved bosses that engage the corners of said core and that confine and guide said core for movement toward and away from said surfaces of said cover, elongated plates that engage said core and said cover and that have notches which accommodate protuberances on said core, said notches in said plates and said protuberances on said core permitting limited movement of said core toward and away from said surfaces, and a resilient element that biases said free ends of said arms toward said surfaces but that can yield to permit said free ends of said arms to move away from said surfaces.

2. The combination of a solenoid and a cover therefor which comprises a solenoid which has a U-shaped core and a T-shaped plunger, said core having inwardly-directed projections on the arms thereof, said inwardly-directed projections being spaced apart to accommodate the stem of said plunger and said inwardly-directed projections having faces to intercept the head of said plunger, said cover having surfaces that receive the free ends of said arms of said core and that resist bending of said arms when said head of said plunger strikes said inwardly-directed projections, said cover having grooved bosses that engage the corners of said core and that confine and guide said core for movement toward and away from said surfaces of said cover, elongated plates that engage said core and said cover and that have notches which accommodate protuberances on said core, said notches in said plates and said protuberances on said core permitting limited movement of said core toward and away from said surfaces, and a resilient element that biases said free ends of said arms toward said surfaces but that can yield to permit said free ends of said arms to move away from said surfaces, a coil form for said solenoid that is removably disposable between said arms of said core, said plates extending through said coil form to hold said coil form against accidental separation from said core.

3. The combination of a solenoid and a cover therefor which comprises a solenoid which has a U-shaped core and a plunger, said core having inwardly-directed projections on the arms thereof, said inwardly-directed projections having faces thereon to intercept said plunger, said cover having surfaces that receive the free ends of said arms of said core and that resist bending of said arms when said faces on said inwardly-directed projections intercept said plunger, said cover having grooved bosses that engage the corners of said core and that confine and guide said core for movement toward and away from said surfaces of said cover, elongated plates that engage said core and said cover and that have notches which accommodate protuberances on said core, said notches in said plates and said protuberances on said core permitting limited movement of said core toward and away from said surfaces, and a resilient element that biases said free ends of said arms toward said surfaces but that can yield to permit said free ends of said arms to move away from said surfaces.

4. The combination of a solenoid and a cover therefor which comprises a solenoid which has a U-shaped core and a plunger, said core having inwardly-directed projections on the arms thereof, said inwardly-directed projections having faces thereon to intercept said plunger, said cover having surfaces that receive the free ends of said arms of said core and that resist bending of said arms when said faces on said inwardly-directed projections intercept said plunger, said cover having grooved bosses that engage the corners of said core and that confine and guide said core for movement toward and away from said surfaces of said cover, and a resilient element that biases said free ends of said arms toward said surfaces but that can yield to permit said free ends of said arms to move away from said surfaces.

5. The combination of a solenoid and a cover therefor which comprises a solenoid which has a U-shaped core and a plunger, said core having inwardly-directed projections on the arms thereof, said inwardly-directed projections having faces thereon to intercept said plunger, said cover having surfaces that receive the free ends of said arms of said core and that resist bending of said arms when said faces on said inwardly-directed projections intercept said plunger, said cover having guiding portions that engage the corners of said core and that confine and guide said core for movement toward and away from said surfaces of said cover, and a resilient element that biases said free ends of said arms toward said surfaces but that can yield to permit said free ends of said arms to move away from said surfaces.

6. The combination of a solenoid and a cover therefor which comprises a solenoid which has a U-shaped core and a plunger, said core having faces that intercept said plunger and that apply bending forces to the arms of said core as they intercept said plunger, said cover having surfaces that receive the free ends of said arms of said core and that resist bending of said arms when said faces of said core intercept said plunger, said cover having guiding portions that engage the corners of said core and that confine and guide said core for movement toward and away from said surfaces of said cover, and a resilient element that biases said free ends of said arms toward said surfaces but that can yield to permit said free ends of said arms to move away from said surfaces.

7. The combination of a solenoid and a cover therefor which comprises a solenoid which has a U-shaped core and a plunger, said core having faces that intercept said plunger and that apply bending forces to the arms of said core as they intercept said plunger, said cover having surfaces that receive the free ends of said arms of said core and that resist bending of said arms when said faces of said core intercept said plunger, and a resilient element that biases said free ends of said arms toward said surfaces but that can yield to permit said free ends of said arms to move away from said surfaces.

8. The combination of a solenoid and a cover therefor which comprises a solenoid which has a U-shaped core and a plunger, said core having faces that intercept said plunger and that apply bending forces to the arms of said core as they intercept said plunger, and said cover having surfaces that receive the free ends of said arms of said core and that resist bending of said arms when said faces of said core intercept said plunger.

9. The combination of a solenoid and a cover therefor which comprises a solenoid which has a U-shaped core and a plunger, said core having faces that intercept said plunger, and said cover having surfaces that receive the free ends of the arms of said core and that serve as stops for said arms of said core, and a resilient element that urges said free ends of said arms against said surfaces, said free ends of said arms of said core being convex, said surfaces of said cover being concave and having a configuration that is generally complementary to the convex free ends of said arms of said core.

10. The combination of an electromagnetic device and a cover therefor, which can secure said electromagnetic device to a support, that comprises an electromagnetic device which has a core, a coil and an armature, a cover that has portions thereof which define a space in which said core and said coil and said armature can be disposed, said electromagnetic device being disposed within said cover, some of said portions of said cover normally engaging and thereby holding said core against separation from said cover and normally holding said core against displacement laterally of said cover, said cover being releasably securable to said support to releasably secure said core, said coil and said armature to said support, said cover constituting the mounting and support for said electromagnetic device.

11. The combination of an electromagnetic device and a cover therefor, which can secure said electromagnetic device to a support, which comprises an electromagnetic device that has a core, a coil and an armature, a cover that encloses said core and said coil and said armature and which has portions which engage the corners of said core and thereby hold said core against movement laterally of said cover, said cover being releasably securable to said support to releasably secure said core, said coil and said armature to said support, said cover constituting the mounting and support for said electromagnetic device.

12. The combination of an electromagnetic device and a cover therefor, which can secure said electromagnetic device to a support, which comprises an electromagnetic device that has a core, a coil and an armature, a cover that encloses said core and said coil and said armature and which has portions which engage said core and thereby hold said core against movement laterally of said cover, said cover being releasably securable to said support to releasably secure said core, said coil and said armature to said support, said cover constituting the mounting and support for said core, coil and armature whereby said electromagnetic device is usable only when mounted within and supported by said cover.

13. The combination of an electromagnetic device and a cover therefor, which can secure said electromagnetic device to a support, which comprises an electromagnetic device that has a core, a coil and an armature, a cover that encloses said core and said coil and said armature and which has portions which engage said core and thereby hold said core against movement laterally of said cover, said cover being releasably securable to said support to releasably secure said core, said coil and said armature to said support, said cover constituting the mounting and support for said core, coil and armature whereby said electromagnetic device is usable only when mounted within and supported by said cover, said portions of said cover permitting limited longitudinal movement of said core relative to said cover.

14. The combination of an electromagnetic device and a cover therefor, which can secure said electromagnetic device to a support, which comprises an electromagnetic device that has a core, a coil and an armature, a cover that encloses said core and said coil and said armature and which has portions which engage said core and thereby hold said core against movement laterally of said cover, said cover being releasably securable to said support to releasably secure said core, said coil and said armature to said support, said cover constituting the mounting and support for said core, coil and armature whereby said electromagnetic device is usable only when mounted within and supported by said cover, said portions of said cover permitting limited longitudinal movement of said core toward and away from the closed end of said cover, and a resilient member that biases said core for movement toward said closed end of said cover.

15. The combination of a solenoid and a cover therefor, which can secure said solenoid to a support, which comprises a solenoid which has a U-shaped core, a coil and a plunger, a cover that encloses said core and said coil and said plunger and which has portions which engage said core and hold said core in assembled relation with said cover, and elongated plates that engage said core and said cover and that have notches which accommodate protuberances on said core, said notches on said plates and said protuberances on said core permitting limited movement of said core relative to said portions of said cover, said cover being releasably securable to said support to releasably secure said core, said coil and said plunger to said support.

16. The combination of an electromagnetic device and a cover therefor, which can secure said electromagnetic device to a support, which comprises an electromagnetic device that has a core, a coil and an armature, a cover that encloses said core and said coil and said armature and which has portions which engage said core and hold said core in assembled relation with said cover, said cover being releasably securable to said support to releasably secure said core, said coil and said armature to said support, said cover being substantially liquid-tight to permit actuation of said armature while said armature is immersed in oil.

17. The combination of a solenoid and a cover therefor which comprises a solenoid which has a core and a plunger, a cover that telescopes over said core and said plunger, said cover being substantially liquid-tight to permit actuation of said armature while said armature is immersed in oil, and an adapter that closes the open end of said cover, said adapter having a push rod that is adapted to engage and to be moved by said plunger, said adapter having air-tight recesses therein which open to said cover but which extend upwardly above said cover so said recesses will trap air whenever said cover is filled with oil, said air being compressable as said oil becomes warm and thereby preventing the generation of destructive pressures within said cover.

18. The combination of a solenoid and a cover therefore which comprises a solenoid which has a core and a plunger, a cover that telescopes over said core and said plunger, said cover being substantially liquid-tight to permit actuation of said armature while said armature is immersed in oil, and an adapter that closes the open end of said cover, said adapter having a push rod that is adapted to engage and to be moved by said plunger, said adapter having a passage through which oil can be introduced into said cover, said adapter having air-tight recesses therein which open to said cover but which extend upwardly above the level of the bottom of said passage to trap air whenever said cover is filled with oil, said air being compressable as said oil becomes warm and thereby preventing the generation of destructive pressures within said cover.

19. The combination of an electromagnetic device and a cover therefor, which can secure said electromagnetic device to a support, which comprises an electromagnetic device that has a core, a coil and an armature, a cover that encloses said core and said coil and said armature and which has portions which engage said core and hold said core in assembled relation with said cover, said cover being releasably securable to said support to releasably secure said core, said coil and said armature to said support, said cover constituting the mounting and support for said core, coil and armature, said cover being substantially liquid-tight to permit actuation of said armature while said armature is immersed in oil, said cover having an opening therein and having a pin that is disposed within said opening, said pin being reciprocable within said opening to move said armature but preventing leakage of oil through said opening.

20. The combination of a solenoid and a cover therefor which comprises a solenoid which has a U-shaped core and a plunger, said core having faces that intercept said plunger and that apply bending forces to the arms of said core as they intercept said plunger, and said cover having surfaces that receive the free ends of said arms of said core and that resist bending of said arms when said faces of said core intercept said plunger, said surfaces being walls that are parallel to the path of movement of said plunger and that abut the inner faces of said free ends of said arms.

21. The combination of a solenoid and a cover therefor which comprises a solenoid which has a U-shaped core and a plunger, said core having faces that intercept said plunger and that apply bending forces to the arms of said core as they intercept said plunger, and said cover having surfaces that receive the free ends of said arms of said core and that resist bending of said arms when said faces of said core intercept said plunger, said surfaces being walls that are spaced apart and that define a recess into which one end of said plunger can move, said walls abutting the inner faces of said arms adjacent said free ends of said arms.

22. The combination of an electromagnetic device and a cover therefor which comprises an electromagnetic device which has a core and an armature and a coil and elongated plates that extend through said coil and that abut said core to prevent accidental separation of said coil from said core, said plates projecting beyond said core, and a pair of walls in said cover that are spaced apart to accommodate the ends of said plates therebetween with the outer faces of said plates abutting the inner faces of said walls, said walls being thick in part to keep the end of one of said plates from passing outwardly of one of said walls while the end of the other of said plates passes inwardly of the other of said walls.

23. The combination of an electromagnetic device and a cover therefor which comprises an electromagnetic device which has a core and an armature and a coil and elongated plates that extend through said coil and that abut said core to prevent accidental separation of said coil from said core, said plates projecting beyond said core, and a pair of walls in said cover, said walls being spaced apart to enable said walls to abut the ends of said plates, said ends of said plates being disposed at corresponding faces of said walls, said walls being thick in part to keep the end of one of said plates from passing outwardly of one of said walls while the end of the other of said plates passes inwardly of the other of said walls.

References Cited in the file of this patent

UNITED STATES PATENTS

| 2,671,187 | Jencks | Mar. 2, 1954 |
| 2,901,677 | Chessman et al. | Aug. 25, 1959 |
| 2,975,340 | Jencks et al. | Mar. 14, 1961 |